(12) United States Patent
Taniguchi et al.

(10) Patent No.: US 10,710,476 B2
(45) Date of Patent: Jul. 14, 2020

(54) RELEASING LEVER FOR SLIDING DEVICE

(71) Applicant: TOYOTA BOSHOKU KABUSHIKI KAISHA, Aichi (JP)

(72) Inventors: Kosuke Taniguchi, Aichi (JP); Atsuyuki Hirose, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/287,348

(22) Filed: Feb. 27, 2019

(65) Prior Publication Data

US 2019/0270393 A1  Sep. 5, 2019

(30) Foreign Application Priority Data

Mar. 5, 2018 (JP) .................................. 2018-038435

(51) Int. Cl.
*F16M 13/00* (2006.01)
*B60N 2/08* (2006.01)
*B60N 2/07* (2006.01)

(52) U.S. Cl.
CPC ........... *B60N 2/085* (2013.01); *B60N 2/0715* (2013.01); *B60N 2/0818* (2013.01); *B60N 2/0881* (2013.01)

(58) Field of Classification Search
CPC .... B60N 1/085; B60N 2/0715; B60N 2/0818; B60N 2/0881
USPC ........ 248/429, 424; 296/65.01, 65.11, 65.13, 296/65.15
See application file for complete search history.

(56) References Cited

U.S. PATENT DOCUMENTS

| 6,902,235 B2 * | 6/2005 | Rohee ...................... B60N 2/08 248/424 |
| 8,616,515 B2 * | 12/2013 | Hayashi ............... B60N 2/0705 248/424 |
| 8,714,509 B2 * | 5/2014 | Hayashi ............... B60N 2/0705 248/429 |
| 9,783,084 B2 * | 10/2017 | Kumagai ............. B60N 2/0705 |
| 2013/0119222 A1 * | 5/2013 | Hayashi ............... B60N 2/0818 248/429 |
| 2014/0348574 A1 * | 11/2014 | Jahner .................. B60N 2/0705 403/106 |

FOREIGN PATENT DOCUMENTS

| EP | 2794344 B1 | 3/2019 |
| JP | 5545835 | 7/2014 |

OTHER PUBLICATIONS

German Office Action dated Jan. 20, 2020 in the corresponding German patent application No. 10 2019 202 168.9 (and English translation thereof).

* cited by examiner

*Primary Examiner* — Todd M Epps
(74) *Attorney, Agent, or Firm* — Greenblum & Bernstein, P.L.C.

(57) ABSTRACT

A releasing lever for a sliding device in one aspect of the present disclosure is used for the sliding device including a movable rail and a fixed rail. The releasing lever includes a first protrusion and a second protrusion. The first protrusion is formed in an intermediate portion of the releasing lever and protrudes in an abutting direction on a first end of the intermediate portion. The second protrusion is formed in a position offset from the first protrusion toward a second end of the intermediate portion, and protrudes in the abutting direction. The first protrusion and the second protrusion contact an inside wall surface of the movable rail at least when the releasing lever pivots.

7 Claims, 12 Drawing Sheets

RELEASING LEVER FOR SLIDING DEVICE

CROSS-REFERENCE TO RELATED APPLICATIONS

This application claims the benefit of Japanese Patent Application No. 2018-038435 filed on Mar. 5, 2018 with the Japan Patent Office, the entire disclosure of which is incorporated herein by reference.

BACKGROUND

The present disclosure relates to a releasing lever used for a sliding device of a vehicle seat.

A sliding device of a vehicle seat comprises a lower rail (a fixed rail), an upper rail (a movable rail), and a releasing lever as described, for example, in Japanese Patent No. 5545835 (Patent Document 1). The fixed rail is fixed to a vehicle.

A seat is fixed to the movable rail, and the movable rail is slidable relative to the fixed rail. The releasing lever is operated by an occupant when the occupant switches between a locked state and a non-locked state.

The locked state is a state where the movable rail is not allowed to slide relative to the fixed rail. The non-locked state is a state where the movable rail is allowed to slide. When the releasing lever is operated, the locked state is released and switched to the non-locked state.

The releasing lever described in Patent Document 1 has a rotational contact protrusion. The rotational contact protrusion is a portion that contacts an inside wall surface of the movable rail and serves as a pivot fulcrum when the releasing lever is operated.

SUMMARY

The rotational contact protrusion of Patent Document 1 is formed by one protrusion. The one protrusion is a portion integrally formed with an upper surface of the releasing lever by plastic working, such as press working. In a case where a tip of the rotational contact protrusion is formed in a spherical shape, the following concerns may arise.

Specifically, the releasing lever may rotate around a central axis parallel to a longitudinal direction of the releasing lever when the releasing lever is operated. Such rotation of the releasing lever during operation may decrease switching stability and switching accuracy between the locked state and the non-locked state.

The present disclosure discloses one example of a releasing lever capable of reducing deterioration in switching stability and switching accuracy.

Provided is a releasing lever for a sliding device. The releasing lever is used for a sliding device that slidably supports a seat and has a movable rail and a fixed rail. The releasing lever is a lever member to switch between a state where the movable rail is not allowed to slide relative to the fixed rail and a state where the movable rail is allowed to slide. The releasing lever is configured to pivot around an intermediate portion in a longitudinal direction of the releasing lever when the releasing lever for the sliding device switches the states. The releasing lever comprises, for example: a first protrusion formed in the intermediate portion, on a first end in a width direction perpendicular to the longitudinal direction, the first protrusion protruding in an abutting direction substantially perpendicular to the longitudinal direction and the width direction; and a second protrusion formed in a position offset from the first protrusion toward a second end in the width direction, the second protrusion protruding in the abutting direction. It is preferable that the first protrusion and the second protrusion contact an inside wall surface of the movable rail at least when the releasing lever pivots.

Therefore, in the releasing lever, two protrusions (that is, the first protrusion and the second protrusion) that are offset from each other in the width direction serve as a pivot fulcrum. This reduces rotation of the releasing lever around a central axis of the releasing lever when the releasing lever is operated, and thus reduces deterioration in switching stability and switching accuracy.

The releasing lever may be configured as follows:

It is preferable that the first protrusion and the second protrusion are formed by cut-and-raised sections that are integrated parts of the intermediate portion. This enables easy and inexpensive formation of the first protrusion and the second protrusion in the releasing lever.

The intermediate portion comprises a first side face and a second side face mutually separated through a space in the width direction, and a connecting portion connecting one end of the first side face with one end of the second side face.

The first protrusion is formed by a cut-and-raised section that is an integrated part of the first side face. The second protrusion is formed by a cut-and-raised section that is an integrated part of the second side face.

Further, it is preferable that the first side face comprises a first bridge portion continuously extending in the longitudinal direction on an end opposite to the first protrusion, and the second side face comprises a second bridge portion continuously extending in the longitudinal direction on an end opposite to the second protrusion.

This results in a continuously and longitudinally connected configuration of the intermediate portion formed by the connecting portion and the two bridge portions. This reduces a drastic decrease in flexural rigidity with a neutral axis lying in the width direction in the intermediate portion.

The first side face comprises a portion substantially parallel to the abutting direction and having a first dimension. The second side face comprises a portion substantially parallel to the abutting direction and having a second dimension. The connecting portion comprises a portion substantially parallel to the width direction and having a width dimension. Under such circumstances, it is preferable that the first dimension and the second dimension are each larger than the width dimension.

This enables a manufacturer to easily increase protruding dimensions of the first protrusion and the second protrusion.

In a configuration where the first protrusion and the second protrusion are cut and raised from the connecting portion, the aforementioned protruding dimensions will be smaller than in the case where the first protrusion and the second protrusion are respectively cut and raised from the first side face and the second side face.

It is preferable that a position at a first end of a root position in the longitudinal direction of the releasing lever is offset in the longitudinal direction with respect to a position at a first end in the longitudinal direction of a root position of the second protrusion, and at the same time, a position at a second end in the longitudinal direction of the root position of the first protrusion is offset in the longitudinal direction with respect to a position at a second end of the root position of the second protrusion.

This enables the first protrusion and the second protrusion to be easily formed by cutting and raising respective corresponding parts of the first side face and the second side face even when the width dimension of the connecting portion is small.

It is preferable that a curvature radius of a curved shape defined by a tip of the first protrusion and a curvature radius of a curved shape defined by a tip of the second protrusion are substantially equal. This enables the releasing lever to pivot smoothly.

BRIEF DESCRIPTION OF THE DRAWINGS

Embodiments of the present disclosure will be described hereinafter with reference to the drawings, in which.

DETAILED DESCRIPTION OF THE PREFERRED EMBODIMENTS

Figure 1:
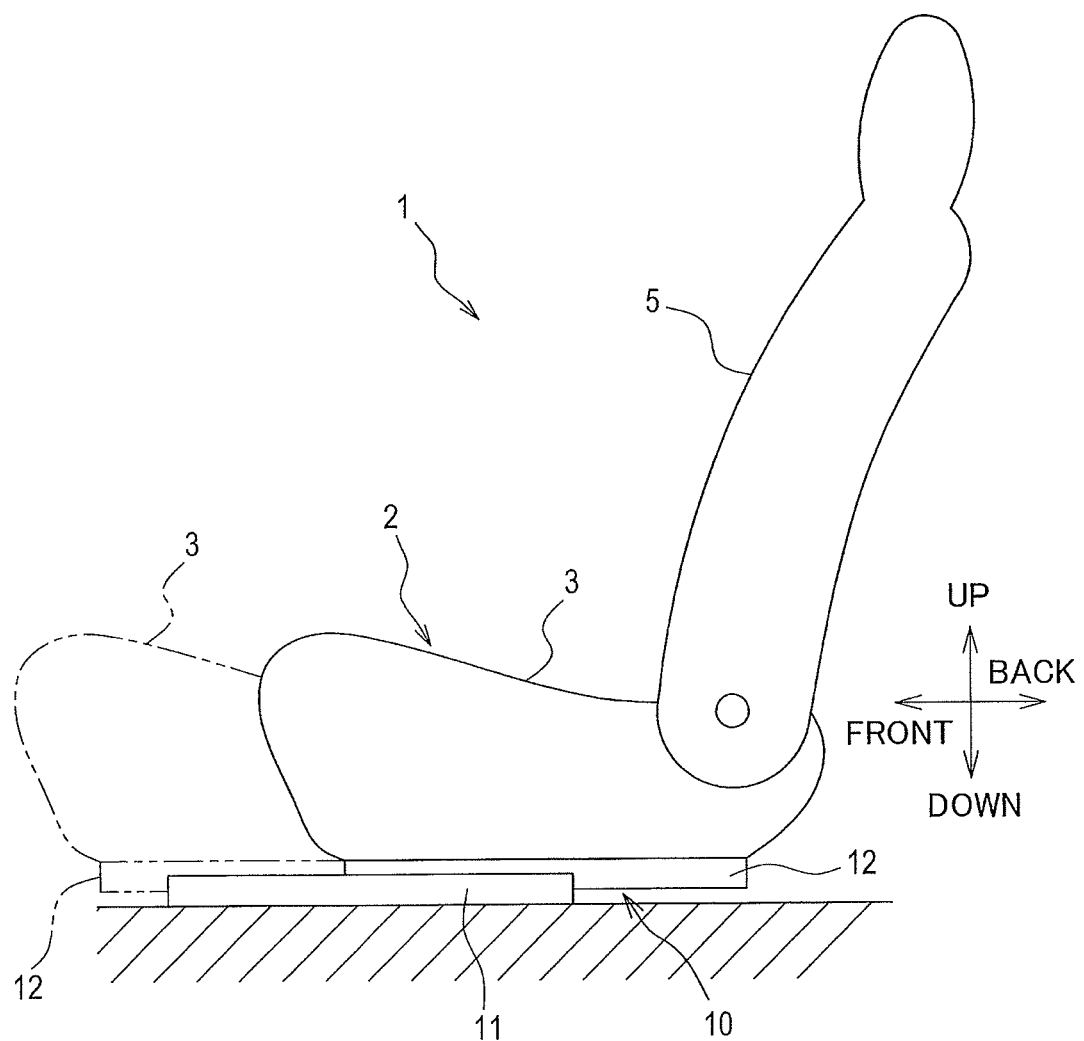
FIG. 1 is a diagram showing a vehicle seat according to a first embodiment.

An "embodiment" described below shows one example. The present disclosure is not limited to any specific configuration, structure, or the like shown in embodiments below.

In a first embodiment, an example of a sliding device in a vehicle seat mounted to a vehicle, such as an automobile, is described. Arrows and other marks indicating directions shown in the drawings are provided for the purpose of easy understanding of mutual relationships among the drawings.

The present disclosure is not limited to directions shown in the drawings. The directions shown in the drawings are based on a state where the vehicle seat according to the first embodiment is mounted in the vehicle.

First Embodiment

1. Overview of Vehicle Seat and Sliding Device

As shown in FIG. 1, a vehicle seat 1 comprises a seat cushion 3 and a seatback 5. The seat cushion 3 is a portion to support an occupant's buttocks. The seatback 5 is a portion to support an occupant's back. The term "occupant" means a passenger of the vehicle or a user of the vehicle seat.

The vehicle seat 1 is supported by at least two sliding devices 10 (only one sliding device 10 is shown in FIG. 1). Although a specific diagram is omitted, a first sliding device 10 of the two sliding devices 10 is arranged on a first end in a seat width direction (on a right end in the first embodiment) to support the seat cushion 3.

Although a specific diagram is omitted, a second sliding device 10 of the two sliding devices 10 is arranged on a second end in the seat width direction (on a left end in the first embodiment) to support the seat cushion 3. The two sliding devices 10 have a left-right symmetrical structure, and the main structures are the same.

2. Configuration of Sliding Device 2.1 Overview of Sliding Device

Figure 2:
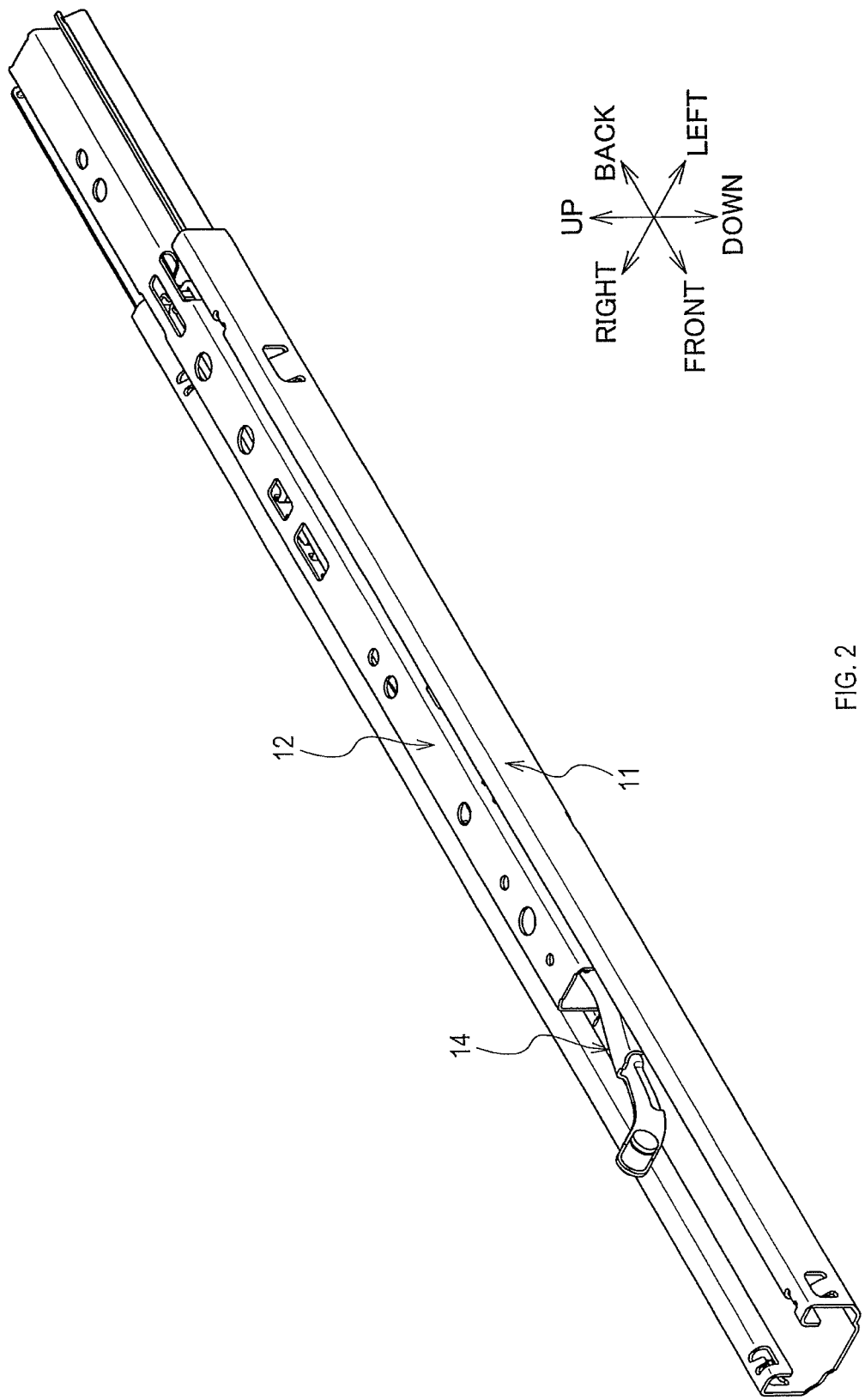
FIG. 2 is a diagram showing a sliding device according to the first embodiment.
Figure 3:
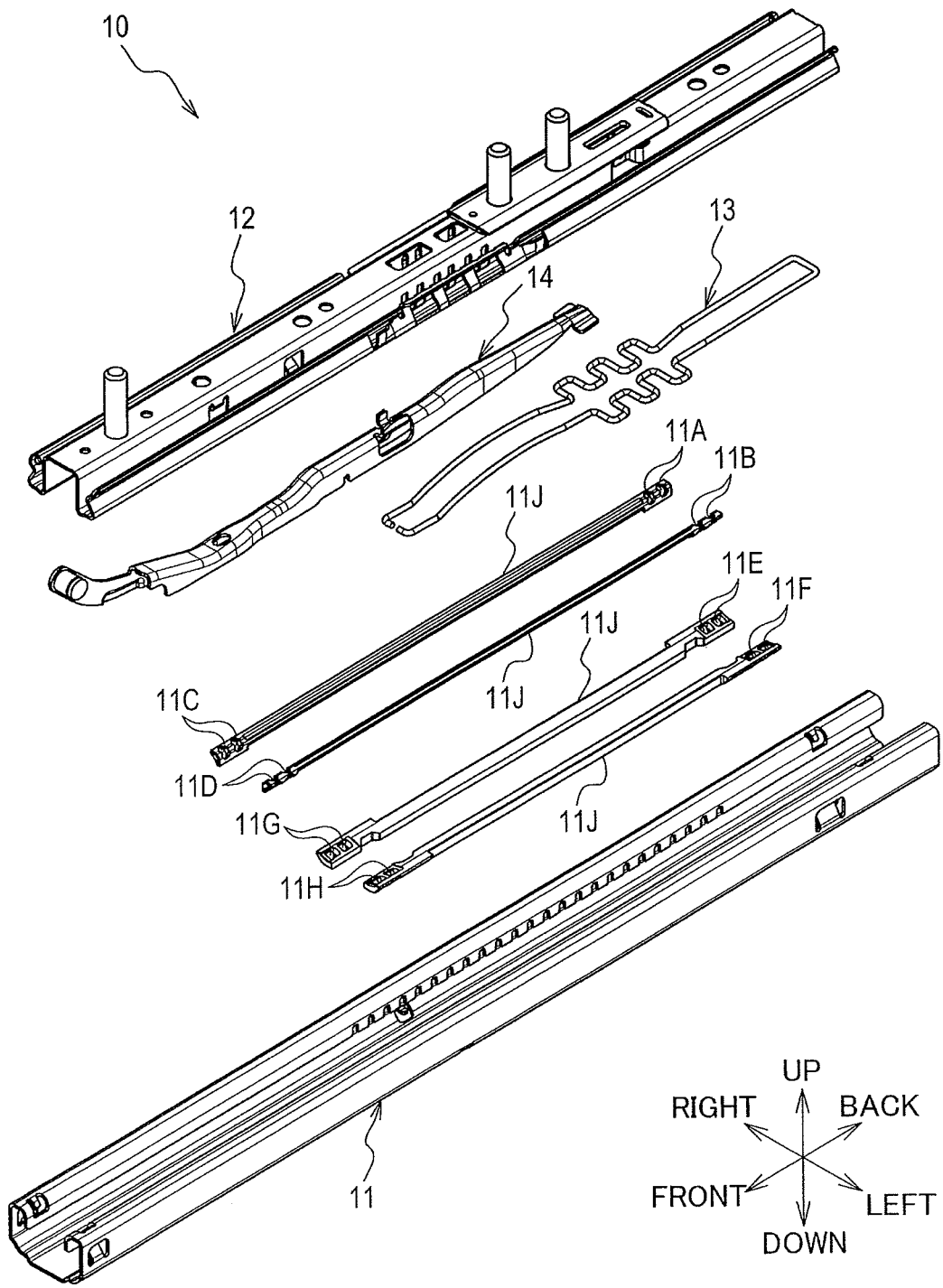
FIG. 3 is an exploded view of the sliding device according to the first embodiment.

As shown in FIG. 2 and FIG. 3, the sliding device 10 comprises a fixed rail 11, a movable rail 12, a lock spring 13 (see FIG. 3), and a releasing lever 14. The fixed rail 11 is fixed to the vehicle.

The movable rail 12 is a member to which the vehicle seat 1 is fixed, and the movable rail 12 is slidable relative to the fixed rail 11. Specifically, the movable rail 12 is supported by the fixed rail 11, for example, via rolling elements 11A to 11H shown in FIG. 3.

Each of the rolling elements 11A to 11H makes rolling contact with the fixed rail 11 and the movable rail 12. This allows sliding displacement of the movable rail 12 along a longitudinal direction of the fixed rail 11. The rolling elements 11A to 11H hold their positions on the fixed rail 11 by retainers 11J.

2.2 Locking Mechanism

A locking mechanism is a mechanism to prevent sliding displacement of the movable rail 12. The locking mechanism includes the lock spring 13 and the releasing lever 14. The lock spring 13 is a member to restrict the movable rail 12 to slide relative to the fixed rail 11.

The lock spring 13 is a member that elastically deforms between a locked state where the lock spring 13 is hooked and engaged with both the fixed rail 11 and the movable rail 12, and a non-locked state where the lock spring 13 is released from the engaged state with the fixed rail 11 and the movable rail 12.

In the locked state, the movable rail 12 is not allowed to slide relative to the fixed rail 11. In the non-locked state, the movable rail 12 is allowed to slide relative to the fixed rail 11.

The releasing lever 14 is a lever member arranged inside the movable rail 12 to switch between the locked state and the non-locked state. The releasing lever 14 is operated directly or indirectly by an occupant. When the releasing lever 14 is operated, the lock spring 13 is elastically deformed by an operation force into the non-locked state.

When the operation force acting on the releasing lever 14 disappears, the lock spring 13 is restored into the locked state. While the releasing lever 14 receives the operation force or the restoring force of the lock spring 13, the releasing lever 14 pivots around an intermediate portion in a longitudinal direction of the releasing lever 14 (around an intermediate portion M).

2.3 Configuration of Releasing Lever

<First Protrusion and Second Protrusion>

Figure 4:
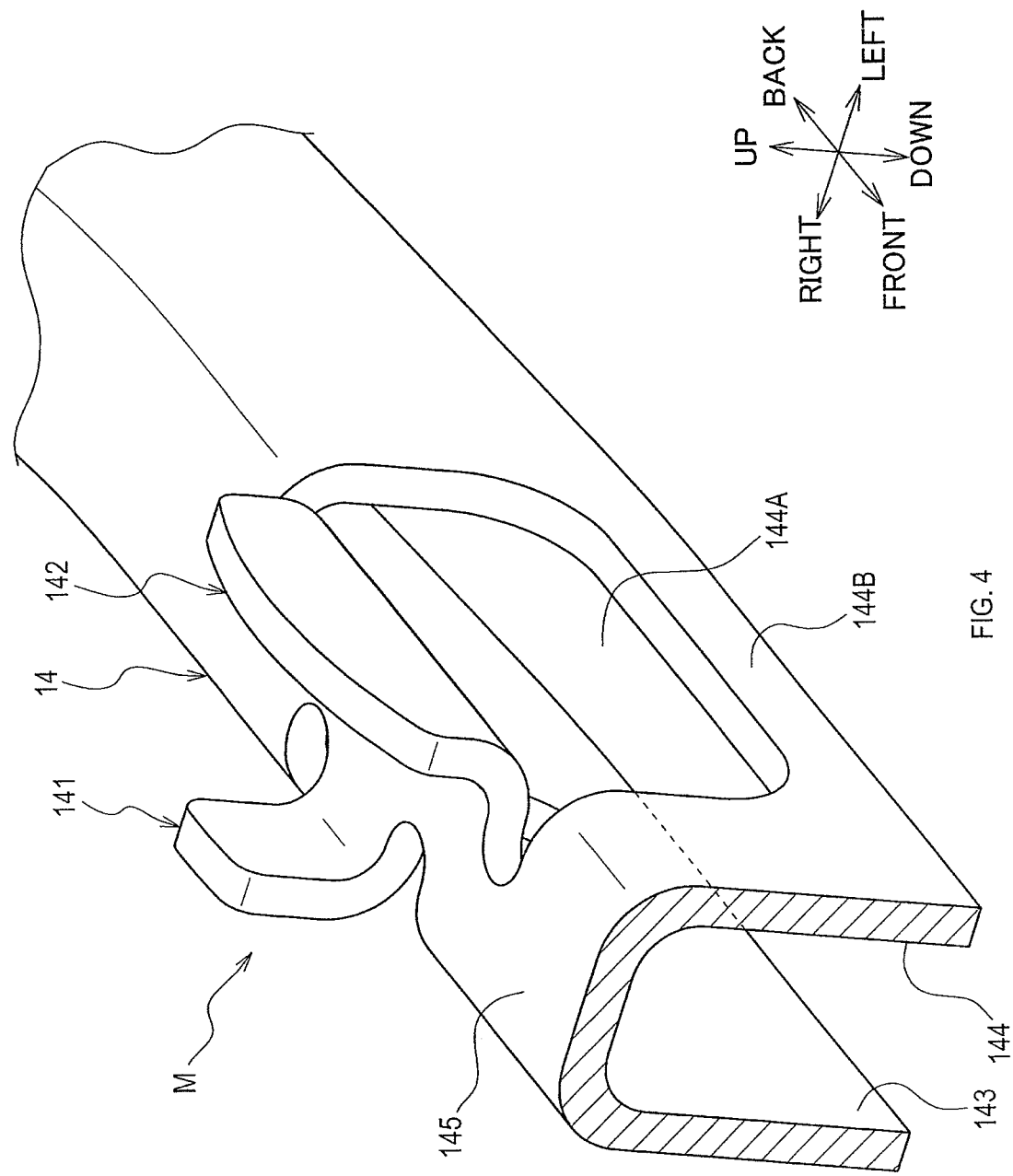
FIG. 4 is a diagram showing an intermediate portion of a releasing lever according to the first embodiment.
Figure 5:
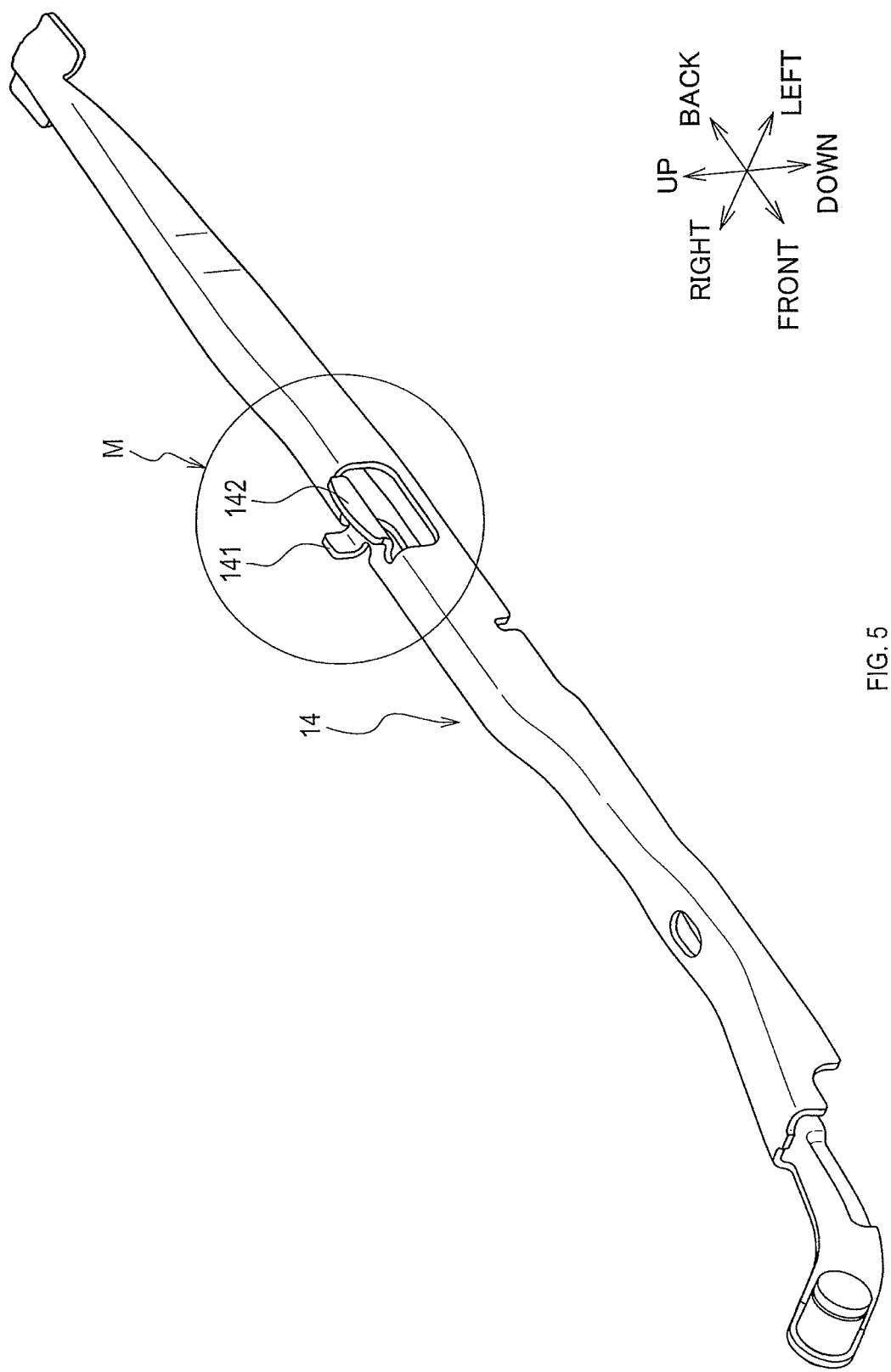
FIG. 5 is a diagram showing the releasing lever according to the first embodiment.

As shown in FIG. 4, the intermediate portion M of the releasing lever 14 comprises a first protrusion 141 and a second protrusion 142. In the first embodiment, the longitudinal direction of the releasing lever 14 corresponds to a seat front-rear direction. The intermediate portion M is not limited to the center in the longitudinal direction of the releasing lever 14 (see FIG. 5).

The first protrusion 141 and the second protrusion 142 contact an inside wall surface of the movable rail 12 and serve as a pivot fulcrum at least when the releasing lever 14 pivots. In this case, the releasing lever 14 pivots on the first protrusion 141 and the second protrusion 142 as a pivot center.

As shown in FIG. 4, the first protrusion 141 protrudes from a first end in a width direction of the intermediate portion M in an abutting direction (a direction toward the movable rail 12 in an assembled state). The second protrusion 142 protrudes from a second end in the width direction of the intermediate portion M in the abutting direction. In other words, the second protrusion 142 protrudes in the abutting direction from a position offset from the first protrusion 141 toward the second end in the width direction.

The width direction is a first direction of the two directions perpendicular to the longitudinal direction of the releasing lever 14. The abutting direction is a second direction of the two directions. That is, the contact direction is a direction substantially perpendicular to the longitudinal direction and the width direction.

In the first embodiment, the longitudinal direction is substantially parallel to the seat front-rear direction. The width direction is substantially parallel to the seat left-right direction. The abutting direction is substantially parallel to a seat up-down direction. The first protrusion 141 protrudes upward on the right end side of the intermediate portion M. The second protrusion 142 protrudes upward on the left end side of the intermediate portion M.

The first protrusion 141 and the second protrusion 142 are portions formed by cutting and raising a metal plate that forms the intermediate portion M. In other words, the first protrusion 141 and the second protrusion 142 are formed by cut-and-raised sections that are integrated parts of a plate material forming the intermediate portion M, that is, cut-and-raised sections integrally continued from a plate material forming the releasing lever 14.

Figure 6:
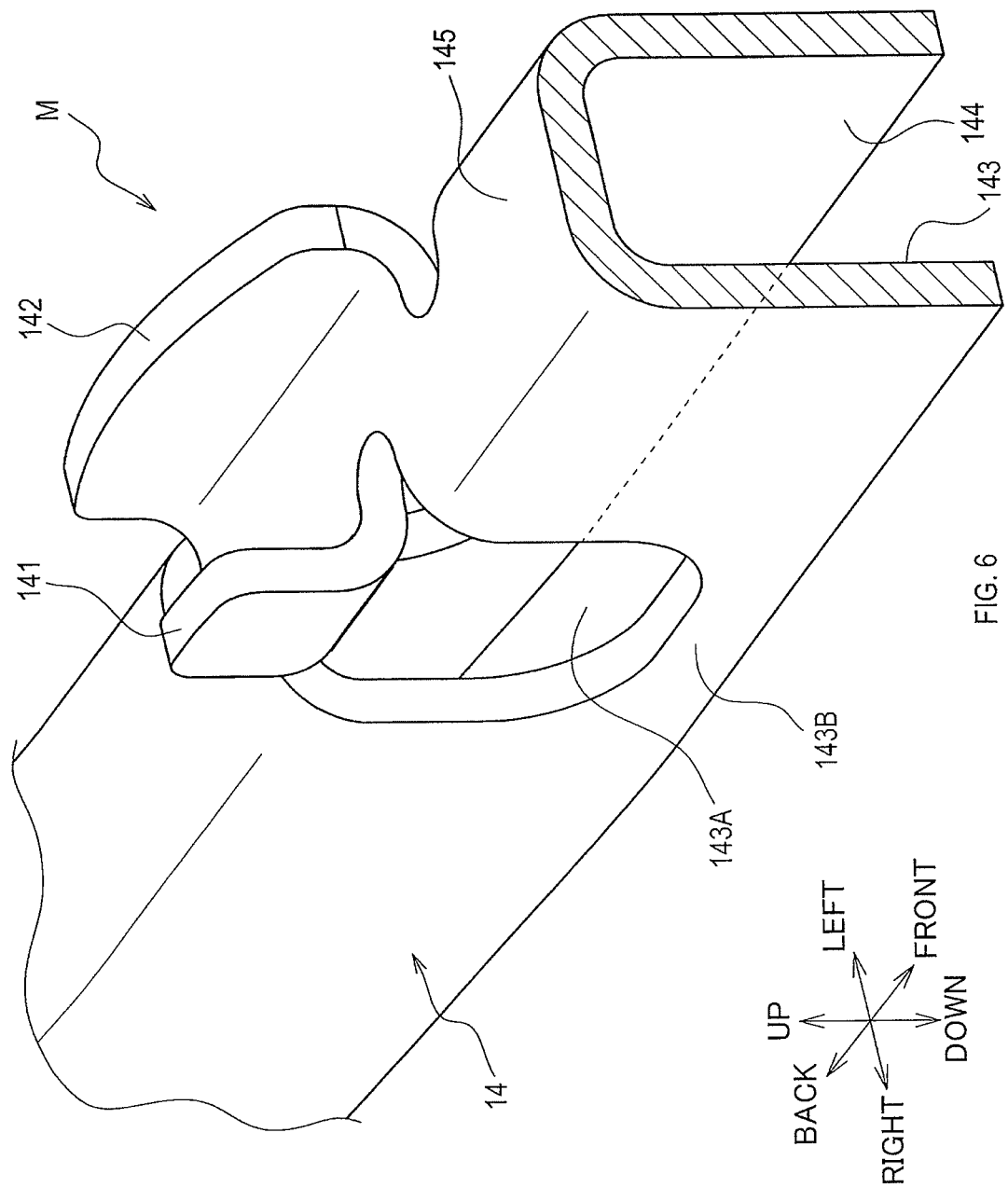
FIG. 6 is a diagram showing the intermediate portion of the releasing lever according to the first embodiment.
Figure 7:
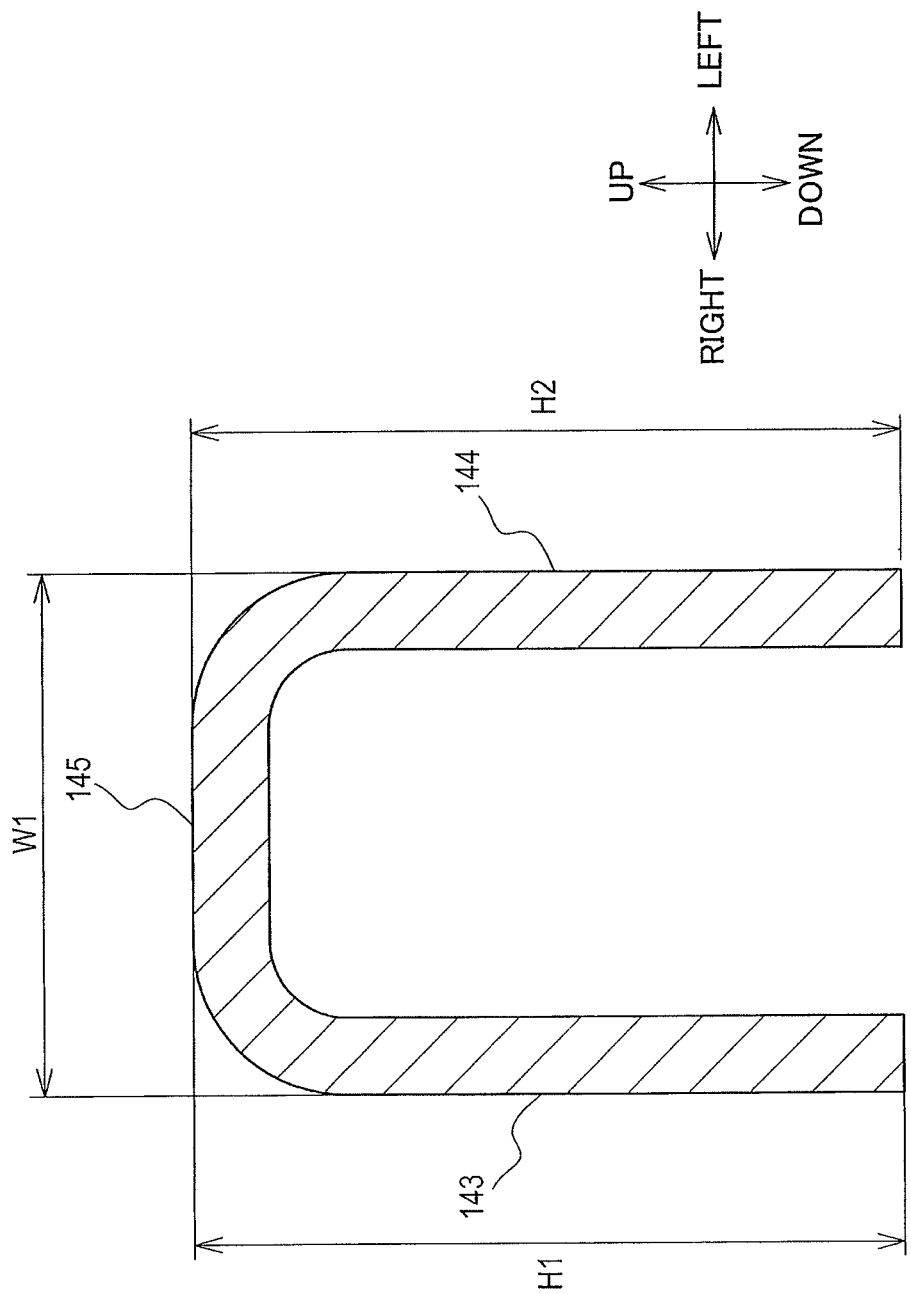
FIG. 7 is a diagram showing the intermediate portion of the releasing lever according to the first embodiment.

As shown in FIG. 6 and FIG. 7, the intermediate portion M has a substantially reverse U-shaped section. The intermediate portion M comprises a first side face 143, a second side face 144, and a connecting portion 145. The first side face 143 and the second side face 144 are mutually separated through a space in the width direction.

The first side face 143 and the second side face 144 are configured by plates substantially parallel to the abutting direction and substantially orthogonal to the width direction. The connecting portion 145 is a portion to connect one end of the first side face 143 with one end of the second side face 144.

The connecting portion 145 according to the first embodiment connects an upper end portion of the first side face 143 with an upper end portion of the second side face 144.

In FIG. 7, a first dimension H1 and a second dimension H2 are each larger than a width dimension W1. The first dimension H1 is a dimension of a portion substantially parallel to the abutting direction in the first side face 143.

The second dimension H2 is a dimension of a portion substantially parallel to the contact direction in the second side face 144. The width dimension W1 is a dimension of a portion substantially parallel to the width direction in the connecting portion 145. In the first embodiment, the first dimension H1 and the second dimension H2 are equal.

<Details of First Protrusion and Second Protrusion>

The releasing lever 14 and the intermediate portion M according to the first embodiment are made of one metal plate by applying plastic working, such as press working. The first protrusion 141 is formed by cutting and raising a part of the first side face 143. The second protrusion 142 is formed by cutting and raising a part of the second side face 144.

In other words, the first protrusion 141 is configured by a cut-and-raised section that is an integrated part of the first side face 143. The second protrusion 142 is configured by a cut-and-raised section that is an integrated part of the second side face 144.

Thus, the first side face 143 has a first hole 143A (see FIG. 6) formed by cutting and raising the first protrusion 141. The second side face 144 has a second hole 144A (see FIG. 4) formed by cutting and raising the second protrusion 142.

As shown in FIG. 6, the first side face 143 comprises a first bridge portion 143B on an end opposite to the first protrusion 141 (at a lower end of the first side face 143). As shown in FIG. 4, the second side face 144 comprises a second bridge portion 144B on an end opposite to the second protrusion 142 (at a lower end of the second side face 144).

The first bridge portion 143B extends in the longitudinal direction at a lower end of the intermediate portion M, as shown in FIG. 6.

The second bridge portion 144B extends in the longitudinal direction at the lower end of the intermediate portion M, as shown in FIG. 4.

Figure 8:
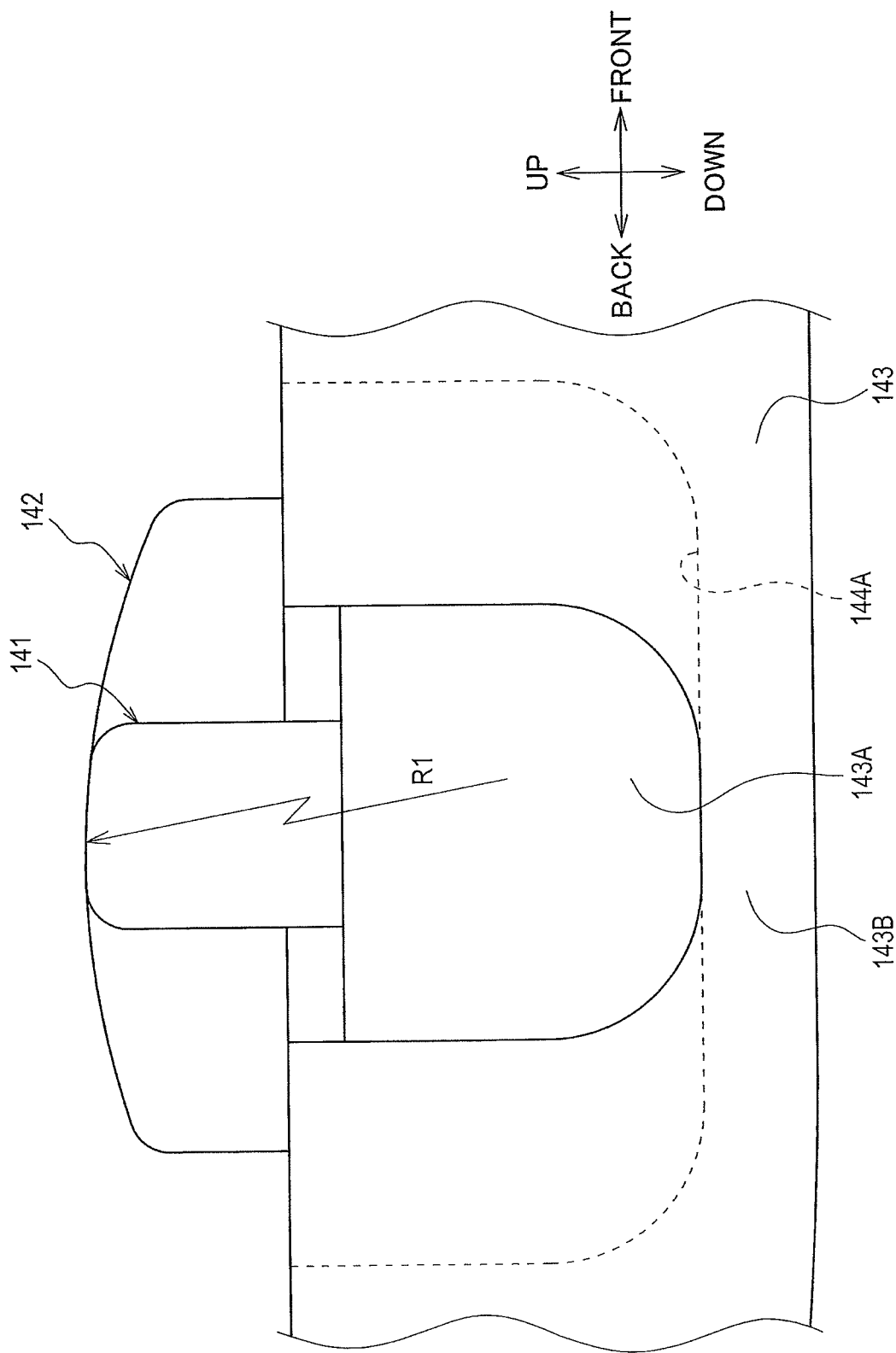
FIG. 8 is a diagram showing the intermediate portion of the releasing lever according to the first embodiment.
Figure 9:
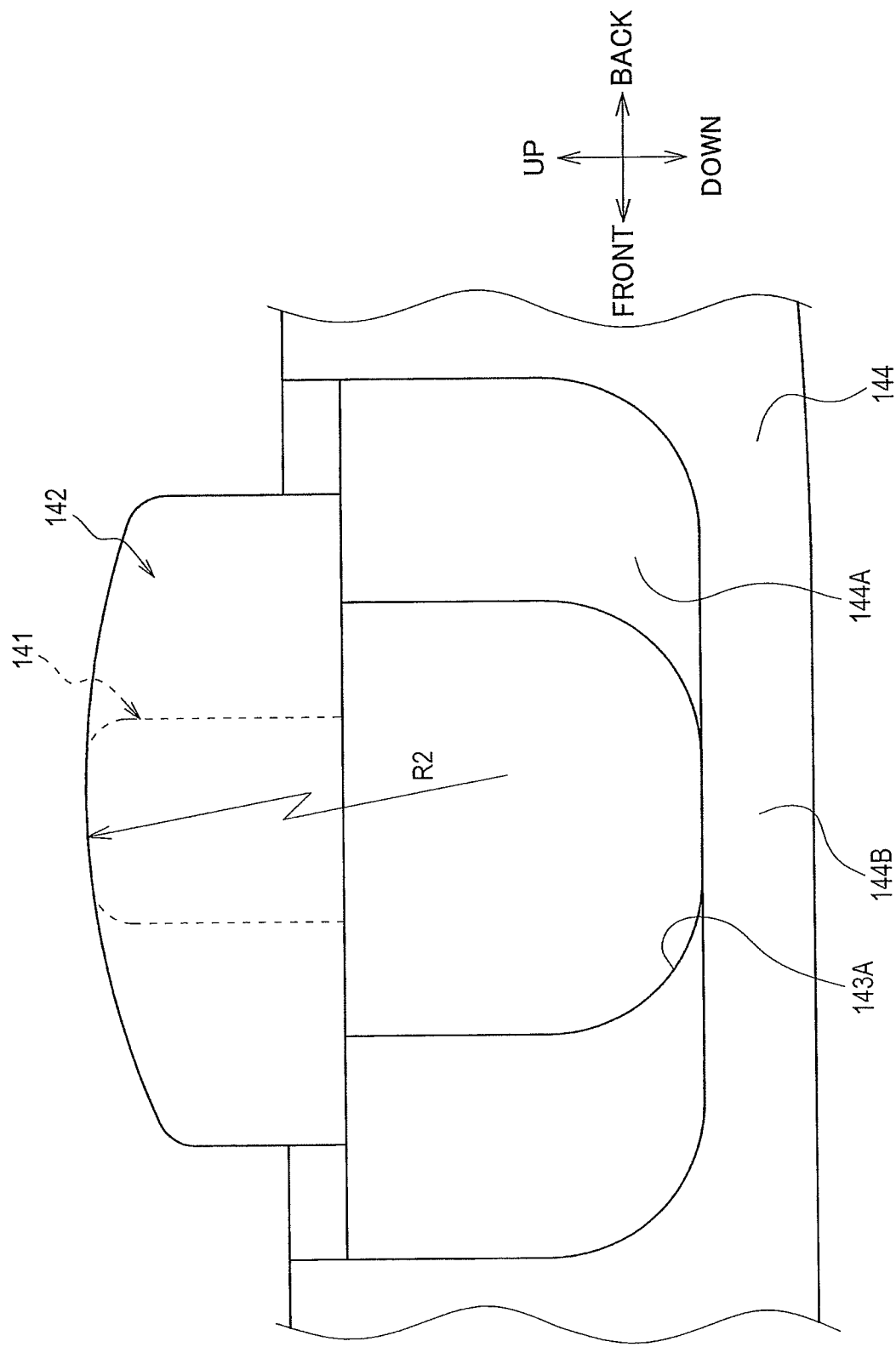
FIG. 9 is a diagram showing the intermediate portion of the releasing lever according to the first embodiment.

A curvature radius R1 (see FIG. 8) of a curved shape defined by a tip of the first protrusion 141 and a curvature radius R2 (see FIG. 9) of a curved shape defined by a tip of the second protrusion 142 are equal. Thus, the tip of the first protrusion 141 projected on an imaginary plane orthogonal to the width direction and the tip of the second protrusion 142 projected on the imaginary plane overlap each other on the imaginary plane, as shown FIG. 8 and FIG. 9.

The tip of the first protrusion 141 is a part of the first protrusion 141 to contact the movable rail 12 during pivoting. The tip of the second protrusion 142 is a part of the second protrusion 142 to contact the movable rail 12 during pivoting.

Figure 10:
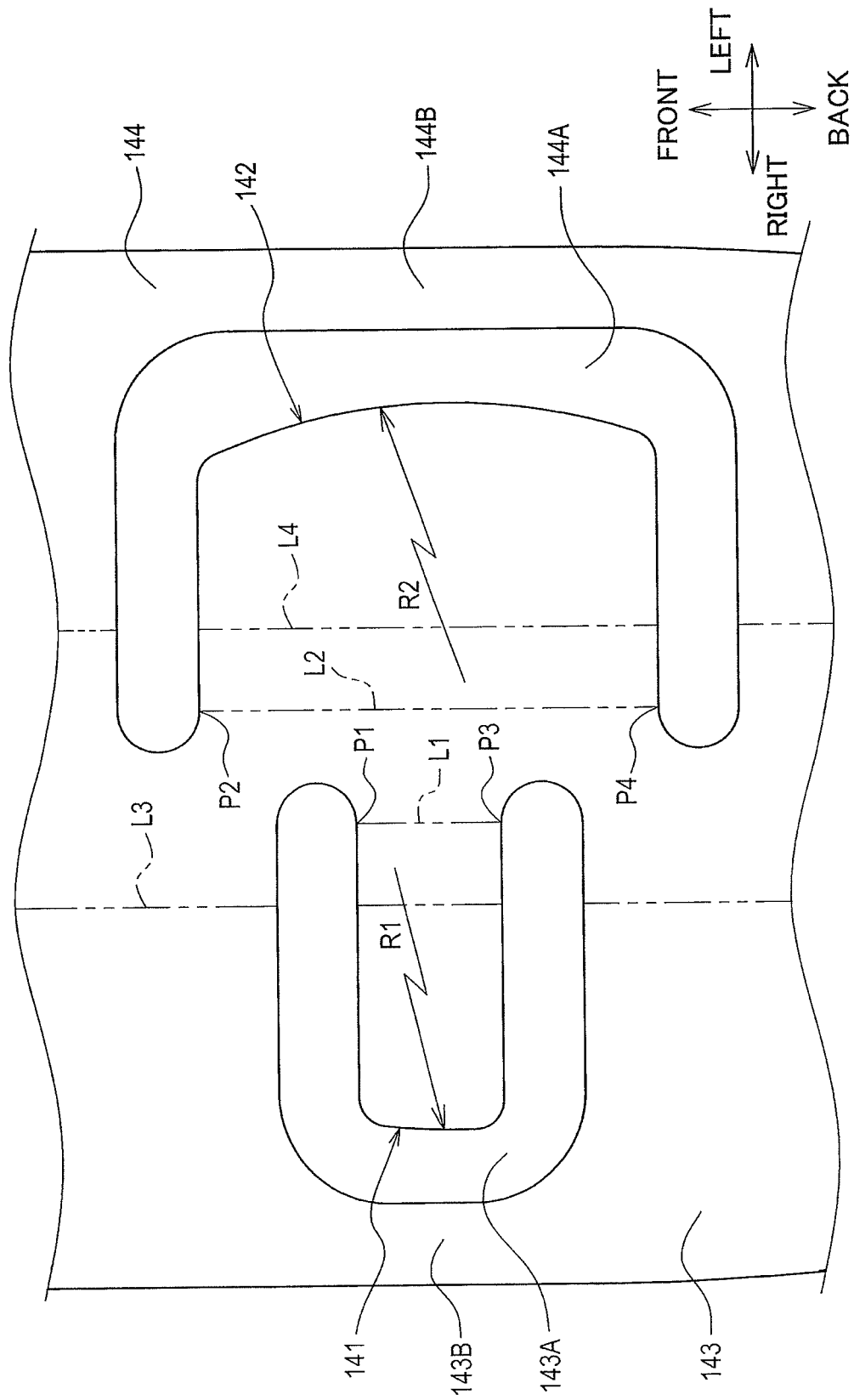
FIG. 10 is a developed view of the intermediate portion of the releasing lever according to the first embodiment.

FIG. 10 is a diagram showing a developed state of the intermediate portion M, in other words, a state of the aforementioned metal plate before bending (press working). A two-dot chain line L1 indicates a root of the first protrusion 141. A two-dot chain line L2 indicates a root of the second protrusion 142. A two-dot chain line L3 indicates an outside wall surface of the first side face 143. A two-dot chain line L4 indicates an outside wall surface of the second side face 144.

A position P1 at a first end of a root position of the first protrusion 141 is offset in the longitudinal direction of the releasing lever 14 with respect to a position P2 at a first end of a root position of the second protrusion 142. A position P3 at a second end of the root position of the first protrusion 141 is offset in the longitudinal direction of the releasing lever 14 with respect to a position P4 at a second end of the root position of the second protrusion 142.

3. Features of Releasing Lever of First Embodiment

The intermediate portion M of the releasing lever 14 comprises the first protrusion 141 and the second protrusion 142 as described above.

Thus, in the releasing lever 14, two protrusions (the first protrusion 141 and the second protrusion 142) serve as a pivot fulcrum. This reduces rotation of the releasing lever 14 around a central axis of the releasing lever 14 when the releasing lever 14 is operated, and thus reduces deterioration in switching stability and switching accuracy.

The first protrusion 141 and the second protrusion 142 are formed by cut-and-raised sections that are integrated parts of a plate material forming the intermediate portion M (integrated parts of a plate material forming the releasing lever 14). This configuration enables easy and inexpensive formation of the first protrusion 141 and the second protrusion 142 in the releasing lever 14.

The first protrusion 141 is configured by the cut-and-raised section that is the integrated part of the first side face 143, and the second protrusion 142 is configured by the cut-and-raised section that is the integrated part of the second side face 144.

The first side face 143 comprises the first bridge portion 143B continuously extending in the longitudinal direction on the end opposite to the first protrusion 141. The second side face 144 comprises the second bridge portion 144B continuously extending in the longitudinal direction on the end opposite to the second protrusion 142.

Thus, the intermediate portion M has a continuously and longitudinally connected configuration of the connecting portion 145, the first bridge portion 143B, and the second bridge portion 144B. This reduces a drastic decrease in a flexural rigidity with a neutral axis lying along an axis in the width direction in the intermediate portion M even in the configuration where the first hole 143A and the second hole 144A are formed.

In the assembled state, the releasing lever 14 is housed in the movable rail 12. Thus, the intermediate portion M has a configuration where a bending with the neutral axis lying along the central axis in the intermediate portion M is less likely to occur. Accordingly, even if the flexural rigidity with the neutral axis lying along the central axis in the intermediate portion M is decreased, little influence is exerted on the operation of the releasing lever 14.

The first dimension H1 and the second dimension H2 are each larger than the width dimension W1. In this case, it is possible to easily increase protruding dimensions of the first protrusion 141 and the second protrusion 142.

In the configuration where the first protrusion 141 and the second protrusion 142 are cut and raised from the connecting portion 145, the aforementioned protruding dimensions become smaller than in the configuration where the first protrusion 141 and the second protrusion 142 are respectively cut and raised from the first side face 143 and the second side face 144.

The position P1 at the first end of the root position of the first protrusion 141 is offset in the longitudinal direction of the releasing lever 14 with respect to the position P2 at the first end of the root position of the second protrusion 142. The position P3 at the second end of the root position of the first protrusion 141 is offset in the longitudinal direction of the releasing lever 14 with respect to the position P4 on the second end of the root position of the second protrusion 142.

Therefore, even in a case where the connecting portion 145 has a small width dimension, it is possible to easily form the first protrusion 141 and the second protrusion 142 in such a way that respective corresponding parts are cut and raised from the first side face 143 and the second side face 144.

For example, in a configuration where the position P1 and the position P2 are close to each other, cracks may occur between the position P1 and the position P2 when the first protrusion 141 is cut and raised from the first side face 143, and the second protrusion 142 is cut and raised from the second side face 144.

In contrast, according to the configuration of the first embodiment, it is possible to increase a distance between the position P1 and the position P2, and a distance between the position P3 and the position P4 without increasing the width dimension W1. This allows reduction in occurrence of cracks without increasing the width dimension W1.

The curvature radius R1 of the curved shape defined by the tip of the first protrusion 141 and the curvature radius R2 of the curved shape defined by the tip of the second protrusion 142 are substantially equal. This allows the releasing lever 14 to pivot smoothly.

Second Embodiment

In the first embodiment described above, the root position P1 of the first protrusion 141 is offset rearward in the longitudinal direction with respect to the root position P2 of the second protrusion 142, and the root position P3 of the first protrusion 141 is offset forward in the longitudinal direction with respect to the root position P4 of the second protrusion 142.

Figure 11:
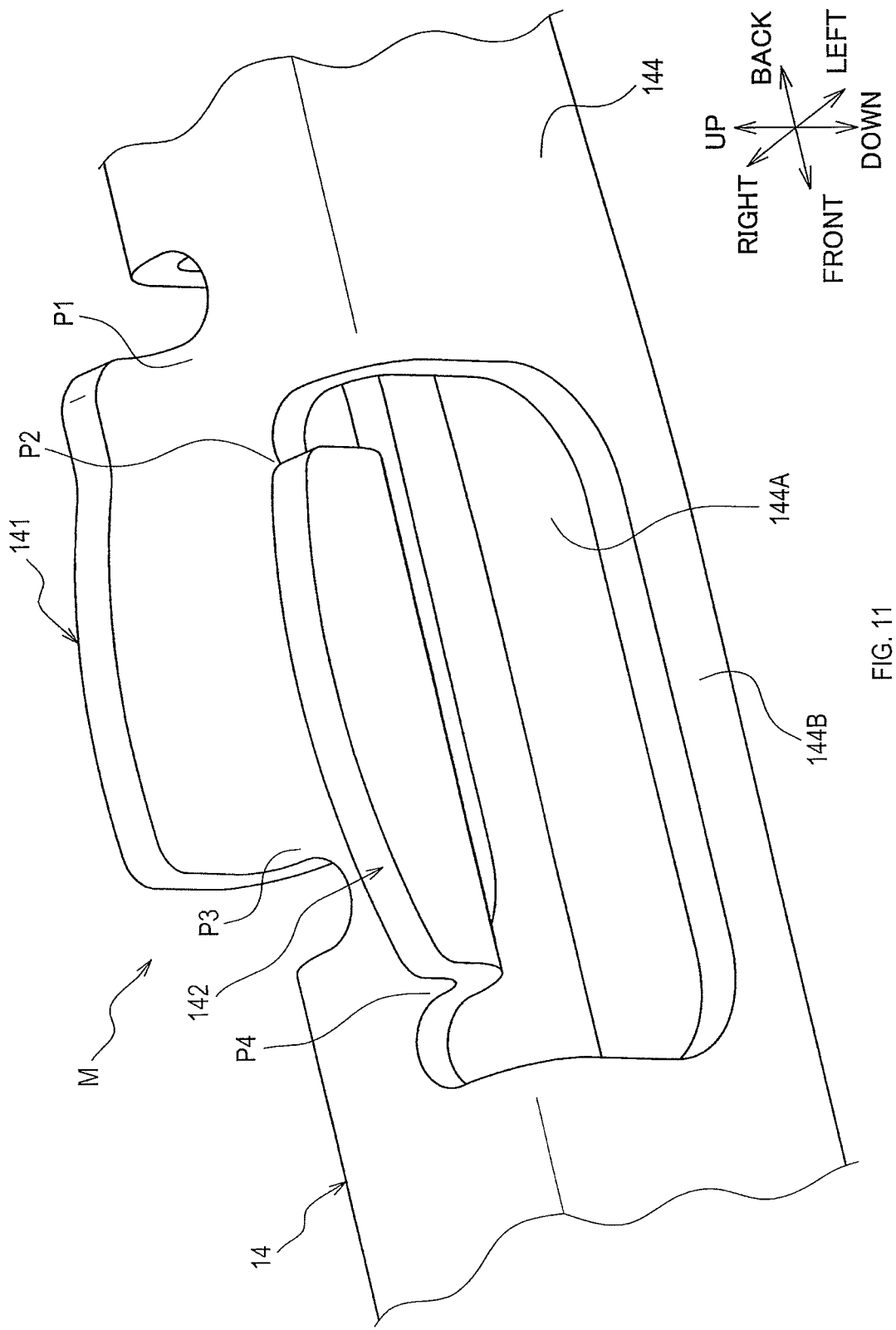
FIG. 11 is a diagram showing an intermediate portion of a releasing lever according to a second embodiment.

In a second embodiment, for example, as shown in FIG. 11, the root position P1 of the first protrusion 141 is offset rearward in the longitudinal direction with respect to the root position P2 of the second protrusion 142, and the root position P3 of the first protrusion 141 is offset rearward in the longitudinal direction with respect to the root position P4 of the second protrusion 142.

Also in the second embodiment, the curvature radius R1 of the tip of the first protrusion 141 and the curvature radius R2 of the tip of the second protrusion 142 are substantially equal. The same components as those in the first embodiment are denoted by the same reference numerals as in the first embodiment. Therefore, no repeated description is given in the second embodiment. Also in the second embodiment, the same effects can be obtained as described in the first embodiment.

The root position P1 of the first protrusion 141 may be offset forward in the longitudinal direction with respect to the root position P2 of the second protrusion 142, and the root position P3 of the first protrusion 141 may be offset forward in the longitudinal direction with respect to the root position P4 of the second protrusion 142.

Third Embodiment

The connecting portion 145 according to the first and second embodiments connects the upper end portion of the first side face 143 and the upper end portion of the second side face 144, and the intermediate portion M is configured to have a substantially reverse U-shaped section opening downward.

Figure 12:
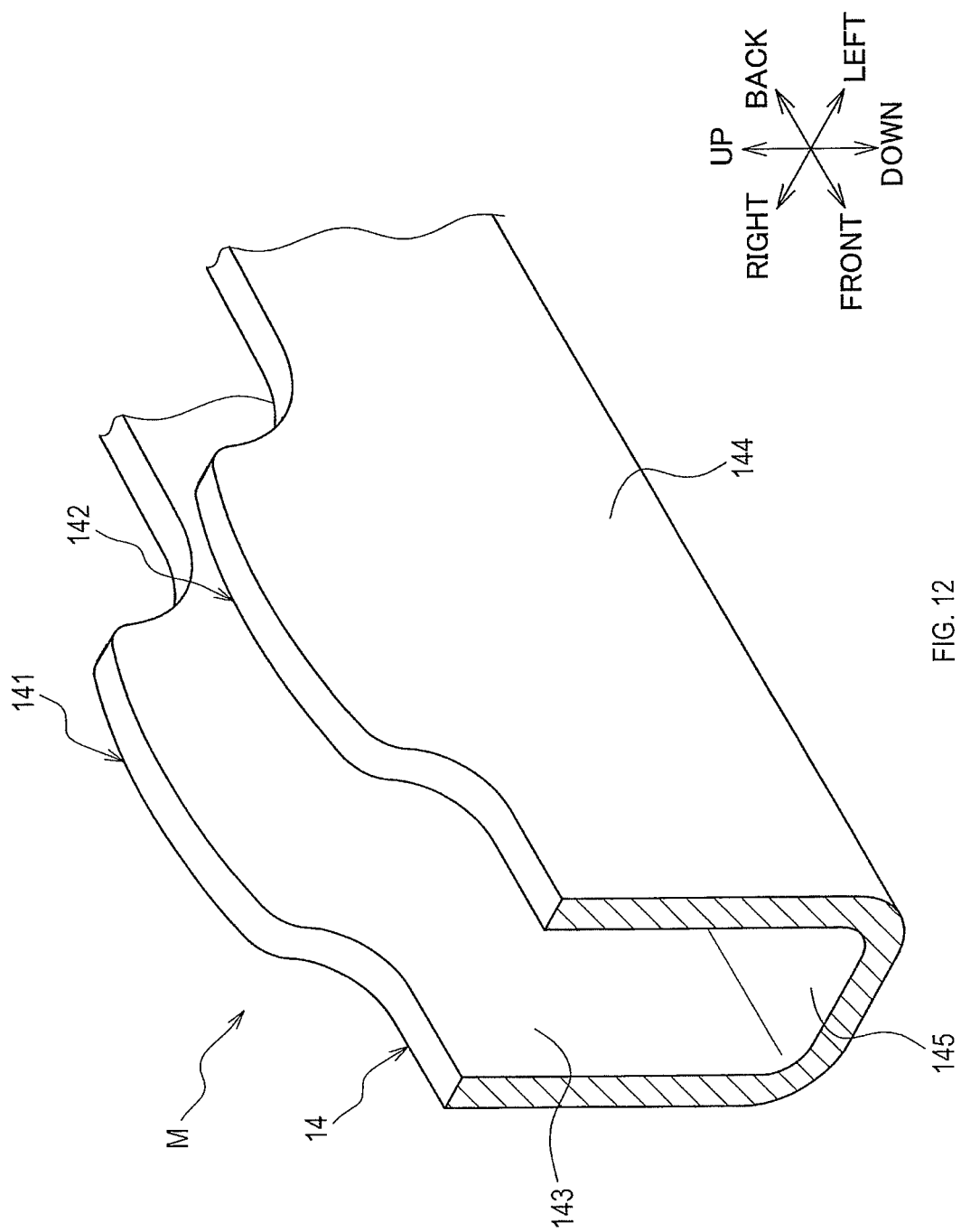
FIG. 12 is a diagram showing an intermediate portion of a releasing lever according to a third embodiment.

In contrast, in a configuration of a third embodiment as shown in FIG. 12, the connecting portion 145 may connect the lower end portion of the first side face 143 and the lower end portion of the second side face 144. In this case, the intermediate portion M may be configured to have a substantially U-shaped section opening upward.

In this case, the first protrusion 141 and the second protrusion 142 according to the third embodiment are not formed by cut-and-raised sections. More specifically, the first protrusion 141 is formed by extending an upper end of the first side face 143. The second protrusion 142 is formed by extending an upper end of the second side face 144.

The same components as those in the first and second embodiments are denoted by the same reference numerals as in the first and second embodiments. Therefore, no repeated description is given in the third embodiment. In the third embodiment, the same effects can be obtained as described in the first and second embodiments.

Other Embodiments

In the above-described embodiments, the first protrusion 141 is integrally formed with the first side face 143, and the second protrusion 142 is integrally formed with the second side face 144. However, the present disclosure is not limited to this configuration.

That is, the present disclosure may include (1) a configuration in which the first protrusion 141 and the second protrusion 142 are cut and raised from the connecting portion 145 or (2) a configuration in which the first protrusion 141 and the second protrusion 142 are welded to the connecting portion 145, so that the first protrusion 141 and the second protrusion 142 are integrated to the intermediate portion M.

In the above-described embodiments, the position P1 at the first end of the root position of the first protrusion 141 is offset in the longitudinal direction of the releasing lever 14 with respect to the position P2 at the first end of the root position of the second protrusion 142, and the position P3 at the second end of the root position of the first protrusion 141 is offset in the longitudinal direction of the releasing lever 14 with respect to the position P4 at the second end in the longitudinal direction of the root position of the second protrusion 142. However, the present disclosure is not limited to this configuration.

In the above-described embodiments, examples of the sliding device 10 used for a vehicle seat have been described. However, the present disclosure is not limited to these embodiments, but may be applied to seats for vehicles, such as railway vehicles, ships and boats, and aircrafts, as well as stationary seats for theaters, homes, and the like.

In addition, in the present disclosure, at least two of the above-described embodiments may also be combined.

What is claimed is:

1. A releasing lever for a sliding device,
the releasing lever being used for the sliding device that slidably supports a seat and has a movable rail and a fixed rail,
the releasing lever being a lever member to switch between a state where the movable rail is not allowed to slide relative to the fixed rail and a state where the movable rail is allowed to slide, the releasing lever being configured to pivot around an intermediate portion in a longitudinal direction of the releasing lever when the releasing lever switches the states,
the releasing lever comprising:
a first protrusion formed in the intermediate portion, on a first end in a width direction perpendicular to the longitudinal direction, wherein the first protrusion protrudes in an abutting direction substantially orthogonal to the longitudinal direction and the width direction; and
a second protrusion formed in a position offset from the first protrusion toward a second end in the width direction, wherein the second protrusion protrudes in the abutting direction,
wherein the first protrusion and the second protrusion contact an inside wall surface of the movable rail at least when the releasing lever pivots.

2. The releasing lever according to claim 1,
wherein each of the first protrusion and the second protrusion is formed by a cut-and-raised section that is an integrated part of the intermediate portion.

3. The releasing lever according to claim 2, wherein the intermediate portion comprises:
a first side face and a second side face mutually separated through a space in the width direction; and
a connecting portion connecting one end portion of the first side face and one end portion of the second side face,
wherein the first protrusion is formed by a cut-and-raised section that is an integrated part of the first side face, and the second protrusion is formed by a cut-and-raised section that is an integrated part of the second side face,
wherein the first side face comprises a first bridge portion continuously extending in the longitudinal direction on an end opposite to the first protrusion,
wherein the second side face comprises a second bridge portion continuously extending in the longitudinal direction on an end opposite to the second protrusion.

4. The releasing lever according to claim 3,
wherein the first side face comprises a portion substantially parallel to the abutting direction and having a first dimension, the second side face comprises a portion substantially parallel to the abutting direction and having a second dimension, and the connecting portion comprises a portion substantially parallel to the width direction and having a width dimension, and
wherein the first dimension and the second dimension are each larger than the width dimension.

5. The releasing lever according to claim 3,
wherein a position at a first end of a root position of the first protrusion is offset in the longitudinal direction with respect to a position at a first end of a root position of the second protrusion, and
wherein a position at a second end of the root position of the first protrusion is offset in the longitudinal direction with respect to a position at a second end of the root position of the second protrusion.

6. The releasing lever according to claim 1,
wherein a curvature radius of a curved shape defined by a tip of the first protrusion and a curvature radius of a curved shape defined by a tip of the second protrusion are substantially equal.

7. A sliding device to slidably support a seat, the sliding device comprising:
a fixed rail fixed to a vehicle;
a movable rail to which the seat is fixed, the movable rail being slidable relative to the fixed rail; and
a releasing lever, the releasing lever being a lever member to switch between a state where the movable rail is not allowed to slide relative to the fixed rail and a state where the movable rail is allowed to slide, the releasing lever being configured to pivot around an intermediate portion in a longitudinal direction of the releasing lever when the releasing lever switches the states,
wherein the releasing lever comprises:
a first protrusion formed in the intermediate portion, on a first end in a width direction perpendicular to the longitudinal direction, wherein the first protrusion protrudes in an abutting direction substantially perpendicular to the longitudinal direction and the width direction; and
a second protrusion formed in a position offset from the first protrusion toward a second end in the width direction, wherein the second protrusion protrudes in the abutting direction, and
wherein the first protrusion and the second protrusion contact an inside wall surface of the movable rail at least when the releasing lever pivots.

* * * * *